(12) United States Patent
Borissov et al.

(10) Patent No.: US 11,846,251 B1
(45) Date of Patent: Dec. 19, 2023

(54) LIQUID ROCKET ENGINE BOOSTER ENGINE WITH COMBUSTION GAS FUEL SOURCE

(71) Applicant: FireFly Aerospace Inc., Cedar Park, TX (US)

(72) Inventors: Anatoli Alimpievich Borissov, Sugar Land, TX (US); Thomas Edward Markusic, Georgetown, TX (US)

(73) Assignee: FIREFLY AEROSPACE INC., Cedar Park, TX (US)

( * ) Notice: Subject to any disclaimer, the term of this patent is extended or adjusted under 35 U.S.C. 154(b) by 0 days.

(21) Appl. No.: 16/857,609

(22) Filed: Apr. 24, 2020

(51) Int. Cl.
*F02K 7/18* (2006.01)
*F02K 9/48* (2006.01)
(Continued)

(52) U.S. Cl.
CPC .................. *F02K 7/18* (2013.01); *F02K 9/48* (2013.01); *F02K 9/64* (2013.01); *F02K 9/74* (2013.01);
(Continued)

(58) Field of Classification Search
CPC ..... F02K 7/10; F02K 7/14; F02K 7/18; F02K 9/74; F02K 9/78
See application file for complete search history.

(56) References Cited

U.S. PATENT DOCUMENTS

| | | | | |
|---|---|---|---|---|
| 2,531,761 A | * | 11/1950 | Zucrow | F02K 9/78 60/225 |
| 2,558,483 A | | 6/1951 | Goddard | |

(Continued)

FOREIGN PATENT DOCUMENTS

| | | |
|---|---|---|
| DE | 1197689 | 7/1965 |
| DE | 10054333 | 5/2002 |

(Continued)

OTHER PUBLICATIONS

Wikipedia, Scramjet, Mar. 13, 2013, https://en.wikipedia.org/wiki/Scramjet (Year: 2013).*

(Continued)

*Primary Examiner* — Kyle Robert Thomas
(74) *Attorney, Agent, or Firm* — ZAGORIN CAVE LLP; Robert W. Holland

(57) ABSTRACT

The inventors introduce the Borissov-Markusic Cycle as the new rocket engine cycle to solve the problem of low efficient open gas generator or tap-off gas generator cycles used to supply power to turbopump. A liquid rocket engine directs turbopump exhaust from a turbopump to a booster engine having an intake to accept ambient airflow, such as a variation of a ramjet, scramjet or dual mode ram scramjet engine. The turbopump is powered by combustion gases, such as from a gas generator or a tap-off manifold interfaced with the liquid rocket engine combustion chamber, and applies energy of the combustion gases to pump fuel and/or liquid oxygen to the liquid rocket engine combustion chamber. The combustion gases have a fuel-rich composition that includes unconsumed fuel from incomplete oxidation so that, upon injection into the combustion chamber of the booster engine, oxidation by ambient air of the unconsumed fuel releases energy to generate thrust with the booster engine.

20 Claims, 10 Drawing Sheets

(51) Int. Cl.
*F02K 9/64* (2006.01)
*F02K 9/74* (2006.01)

(52) U.S. Cl.
CPC ...... *F05D 2220/80* (2013.01); *F05D 2240/35* (2013.01); *F05D 2260/205* (2013.01)

(56) References Cited

U.S. PATENT DOCUMENTS

| | | | |
|---|---|---|---|
| 2,558,484 A | 6/1951 | Goodard | |
| 2,659,195 A * | 11/1953 | Bolanovich | F02K 7/10 |
| | | | 60/767 |
| 2,749,706 A | 6/1956 | Goddard | |
| 3,035,333 A | 1/1959 | Baehr | |
| 2,880,577 A | 4/1959 | Leonard | |
| 2,977,754 A | 4/1961 | Bell, Jr. | |
| 3,043,103 A | 7/1962 | Dent et al. | |
| 3,127,737 A | 4/1964 | Ledwith | |
| 3,127,738 A | 4/1964 | Augustus et al. | |
| 3,134,224 A * | 5/1964 | Lippincott | F02K 9/48 |
| | | | 60/266 |
| 3,161,378 A * | 12/1964 | Creasey | B64C 30/00 |
| | | | 244/53 B |
| 3,176,464 A * | 4/1965 | Meyer | F02K 9/72 |
| | | | 60/233 |
| 3,188,203 A | 6/1965 | Peaslee | |
| 3,285,175 A * | 11/1966 | Keenan | F02K 9/78 |
| | | | 102/377 |
| 3,413,810 A | 12/1968 | Kaufmann | |
| 3,695,515 A | 10/1972 | Stockel | |
| 3,699,772 A | 10/1972 | Elverum, Jr. | |
| 3,710,574 A | 1/1973 | Pearson | |
| 3,740,003 A | 6/1973 | Ayre et al. | |
| 3,768,256 A | 10/1973 | Butter | |
| 4,156,306 A | 5/1979 | Seidel et al. | |
| 4,430,977 A | 2/1984 | Shimada | |
| 4,485,866 A | 12/1984 | Hemmerich | |
| 4,707,225 A | 11/1987 | Schuler | |
| 5,014,508 A * | 5/1991 | Lifka | B64G 1/401 |
| | | | 60/224 |
| 5,172,548 A * | 12/1992 | Dubedout | F02K 9/52 |
| | | | 60/258 |
| 5,249,357 A | 10/1993 | Holmes et al. | |
| 5,622,046 A | 4/1997 | Michaels et al. | |
| 6,688,100 B1 | 2/2004 | Wherley et al. | |
| 6,783,824 B2 | 8/2004 | Steffier | |
| 6,829,884 B2 | 12/2004 | Fint et al. | |
| 6,860,099 B1 | 3/2005 | Xenofos et al. | |
| 7,343,732 B2 | 3/2008 | Hewitt | |
| 7,503,511 B2 | 3/2009 | Mueller | |
| 7,603,843 B2 | 10/2009 | Froehlich | |
| 8,292,217 B2 * | 10/2012 | Smith | G06F 30/15 |
| | | | 244/53 B |
| 9,249,758 B2 * | 2/2016 | Conrardy | F02K 9/52 |
| 9,650,958 B2 | 5/2017 | DiCintio et al. | |
| 9,835,114 B1 | 12/2017 | Gradl et al. | |
| 10,907,905 B2 | 2/2021 | Masgrau | |
| 10,927,793 B2 * | 2/2021 | Gabaldo | F02K 1/06 |
| 2006/0144959 A1 | 7/2006 | Hewitt | |
| 2008/0121548 A1 | 5/2008 | Yousefiani | |
| 2013/0219719 A1 | 8/2013 | Sisk | |
| 2014/0325958 A1 * | 11/2014 | Conrardy | F02K 9/48 |
| | | | 60/246 |
| 2015/0308384 A1 | 10/2015 | Barthoulot et al. | |
| 2018/0010552 A1 | 1/2018 | Brummer | |
| 2018/0119644 A1 * | 5/2018 | Gabaldo | F02K 7/14 |

FOREIGN PATENT DOCUMENTS

| | | | |
|---|---|---|---|
| DE | 10156124 | 6/2003 | |
| GB | 2190964 A * | 12/1987 | F02K 7/18 |
| WO | 1999004156 A1 | 1/1999 | |
| WO | 2002/055864 | 7/2002 | |

OTHER PUBLICATIONS

Wikipedia, Ramjet, Jun. 20, 2013, https://en.wikipedia.org/wiki/ramjet (Year: 2013).*
Sutton, G. and Biblarz, O., "Rocket Propulsion Elements" Seventh Edition, 2001, 764 pages.
Sutton, G. and Biblarz, O., "Rocket Propulsion Elements" Eighth Edition, 2010, 8 pages.
Orr, G.J., XCompute: Advanced Systems for Complex Science & Engineering, Apr. 19, 2018, 47 pages.
Pillow, C.E., Altitude Developmental Testing of the J-2S Rocket Engine in Rocket Development Test Cell (J-4) (Tests J4-1001-06, -07, -11, and -15), Sep. 1970, 118 pages.
Wikipedia, "Air-Augmented Rocket," downloaded from https://en.wikipedia.org/wiki/Air-augmented_rocket on Apr. 24, 2020, 5 pages.
Wikipedia, "Ramjet," downloaded from https://en.wikipedia.org/wiki/Ramjet on Apr. 24, 2020, 15 pages.
Sui, Y., et al., "Fluid Flow and Heat Transfer in Wavy Microchannels," International Journal of Heat and Mass Transfer 53, Mar. 19, 2010, pp. 2760-2772.
Urade, A., et al., "Review on Heat Transfer Enhancement Using the Wavy Fin," International Engineering Research Journal (IERJ), Special Issue, Nov. 4, 2015, pp. 49-53.
Borissov, A., "Our Wavy Cooking Channels Design Also Confirmed by Artificial Intelligent," Adrian Bejan & Constructal Law, Mar. 9, 2022, 3 pages.

* cited by examiner

LIQUID ROCKET ENGINE BOOSTER ENGINE WITH COMBUSTION GAS FUEL SOURCE

BACKGROUND OF THE INVENTION

Field of the Invention

The present invention relates in general to the field of liquid rocket engines, and more particularly to a liquid rocket engine booster engine with consumption gas fuel source.

Description of the Related Art

Liquid rocket engines generate thrust by burning propellant, such as fuel mixed with liquid oxygen, in a combustion chamber at extremely high temperatures and pressures, and exhausting the combustion gases through a throat and out a nozzle to produce a supersonic airflow. Generally, rockets launch payloads, such as satellites, into orbit by generating thrust in excess of the weight of the rocket, fuel and oxygen stored onboard the rocket and the payload. By minimizing rocket structural weight and maximizing efficient use of propellant, payload weight improves for a desired orbit. Firefly Aerospace Inc. has invented a cross-impinged propellant injection and a cooling channel arrangement that improve payload, as described in the following two patent applications, which are incorporated herein as though fully set forth: "Liquid Rocket Engine Cooling Channels," U.S. patent application Ser. No. 16/256,210, and "Liquid Rocket Engine Cross Impinged Propellant Injection," U.S. patent application Ser. No. 16/256,206, both by Anatoli Alimpievich Borissov and Thomas Edward Markusic, the inventors hereof. In addition, Firefly Aerospace Inc. has invented a tap-off gas power source arrangement that improves payload by reducing weight associated with a gas generator that powers fuel and oxygen pumps of the liquid rocket engine, as described in the following patent application, which is incorporated herein as though fully set forth: "Liquid Rocket Engine Tap-off Power Source," U.S. patent application Ser. No. 16/584,449, by Thomas Edward Markusic and Anatoli Alimpievich Borissov, the inventors hereof.

Generally, liquid rocket engines create thrust as a function of the mass flow of propellant that exits the nozzle, which includes the mass and velocity of the air flow. Liquid rocket engines pump a fuel, such as kerosene, and liquid oxygen into a combustion chamber where high pressures generated by combustion can only escape through the nozzle opening. Because liquid rocket engines carry their own oxygen supply, they can generate thrust outside of the Earth's atmosphere. In some instances, a liquid rocket engine will have solid rocket engine boosters that can add to a rocket's overall thrust to increase the rocket's payload. Solid rocket engines burn a solid propellant that also does not use atmospheric oxygen. Generally, because of the energy content of solid rocket propellants, solid rocket engines cannot achieve orbit with an effective payload.

In contrast to liquid rocket engines, "air breathing" jet engines require a minimal amount of atmospheric oxygen to burn fuel. Generally, turbojet engines have an intake in front that accepts airflow into a combustion chamber where atmospheric oxygen burns fuel carried by an aircraft to generate thrust through an exhaust at the rear of the turbojet engine. In order to force air into the combustion chamber, a turbine located aft of the combustion chamber rotates a compressor located in front of the combustion chamber to compress air accepted at the intake into the combustion chamber. Without sufficient compression by the compressor, high pressure combustion products within the combustion chamber would exhaust from both the intake and the exhaust. One advantage of a turbojet engine over a liquid rocket engine is that the mass flow produced by a turbojet engine includes environmental air, which reduces the weight of propellant (i.e., liquid oxygen) carried by an aircraft compared to a rocket. In some cases, aircraft with turbojet or similar turbo fan engines are used to carry rockets to an altitude where the rockets are released from the aircraft and ignited. Air launch of a rocket reduces the rocket launch weight but can require a large aircraft frame to carry the rocket. Generally, however, turbojet engines are not a feasible option to attach directly to a rocket due to their weight, complexity, expense and limited altitude operating range.

Alternative "air breathing" engines that have found application as liquid rocket engine boosters include variants of the ramjet engine, such as ramjet, scramjet and dual mode ram/scram (DMRS) engines. Each of these ramjet engine variants uses forward motion through ambient air to force airflow through an intake and into a combustion chamber where fuel is added and burned to generate thrust out an exhaust. A ramjet engine has an intake formed to compress a supersonic airflow into a subsonic airflow at the combustion chamber. At higher speeds, such as hypersonic airflows of greater than Mach 6, compression by the ramjet intake heats the air to a point at which burning fuel fails to efficiently add thrust. Scramjet engines operate at these higher airspeeds by maintaining a supersonic airflow through the combustion chamber where fuel is added and burned to create thrust. As a general comparison when burning hydrocarbon fuel, ramjet engines tend to operate most efficiently at around Mach 3, while scramjet engines tend to operate most efficiently between Mach 4 and Mach 10. When burning hydrogen as fuel, scramjet engines may extend efficient operation to greater than Mach 20. The specific operating range of ramjet variant engines varies based upon the design of the engine, such as the shape of the intake and combustion chamber. DMRS engines attempt to leverage both subsonic compressions used by ramjets and supersonic flow used by scramjets by adjusting the engine intake and combustion chamber to adapt to changing airflow speeds. DMRS engines have greater complexity with adjustable intakes, however, DMRS engines offer greater efficiency where a vehicle changes airflow characteristic in flight.

Some efforts have been made by the aerospace industry to adapt ramjet variant engines as boosters to aid launch of rockets powered by liquid rocket engines. An advantage of a ramjet variant engine over a liquid rocket engine is that burning ambient air reduces the amount of oxidant (i.e., liquid oxygen) that the rocket must carry and thus increases the rocket payload. A difficulty with adopting ramjet variant engines to aid rocket launch is that a rocket's ambient airflow changes dramatically as the rocket accelerates and climbs out of the atmosphere. At liftoff, a rocket has insufficient ambient airflow velocity to support generation of any substantial thrust by a ramjet so that any fuel burned by the ramjet is inefficiently expended. Some "air augmented" rockets use an internal combustion by a solid rocket fuel within a ramjet engine to compress and react with ambient air to initiate thrust at lower speeds, such as solid fuel integrated rocket ramjets and ducted rockets; however, even these specialized ramjet variants produce thrust with minimal efficiency until supersonic speeds are reached. Thus, fuel directed towards a ramjet engine at rocket launch may even have a negative impact on payload. Once the rocket accelerates to supersonic speeds, subsonic compression of airflow in a ramjet engine results in increased ambient airflow temperatures and inefficient fuel consumption. Transition to scramjet supersonic flow compression and combustion, such as with a DMRS engine, can provide additional thrust at hypersonic speeds, provided supersonic fuel oxidation is achieved. Additional thrust provided at hypersonic airspeeds tends to taper off as rocket altitude and speed increase. Given these difficulties, dedicating fuel for consumption by ramjet boosters may provide less additional thrust than is needed to justify the addition of the ramjet booster weight and drag.

SUMMARY OF THE INVENTION

Therefore, a need has arisen for a system and method which generates thrust with a ramjet variant booster engine to increase the effective payload of a rocket powered by a liquid rocket engine.

In accordance with the present invention, a new system and method are provided which substantially reduce the disadvantages and problems associated with previous methods and systems that generate thrust with ramjet variant booster engines to fly a payload on a rocket powered by a liquid rocket engine. Heated gas applied to power a turbopump of the liquid rocket engine, such as to pump propellant, includes unconsumed fuel that is oxidized with ambient air in a ramjet booster engine to generate thrust. The turbopump exhaust is interfaced with the ramjet combustion chamber to oxidize the unconsumed fuel with ambient air to generate thrust.

More specifically, a liquid rocket engine thruster body generates thrust by burning fuel and oxygen injected into a combustion chamber to create a supersonic flow out a throat and nozzle from the combustion chamber. A turbopump pumps fuel and liquid oxygen under high pressure into the combustion chamber with power provided by heated gas, such as combustion gases of a gas generator or combustion gases received from the thruster body combustion chamber at a tap-off manifold that interfaces with the thruster body combustion chamber. Combustion gases generated by the gas generator or tap-off manifold have a fuel-rich composition that includes unconsumed fuel, such as partially burned fuel byproducts. In the case of tap-off manifold combustion gases, the combustion chamber combustion gases pass from the combustion chamber to the tap-off manifold through tap-off openings formed in the thruster body and cooled by fuel in fuel channels integrated in the thruster body. Tap-off fuel injection openings in the fuel channels add fuel to the tap-off gases as the tap-off gases proceed through the tap-off openings. The combustion gas powers the turbopump, such as to pump fuel and liquid oxygen to the thruster body combustion chamber, and then exhausts from the turbopump to enter a booster combustion chamber of a ramjet variant booster engine, such as a ramjet, scramjet or DMRS engine. The unconsumed fuel within the combustion gas is oxidized with ambient air that enters the ramjet booster engine through an intake to generate thrust as a supersonic flow that exhausts at a nozzle of the ramjet booster.

The present invention provides a number of important technical advantages. One example of an important technical advantage is that a liquid rocket engine obtains thrust from ramjet variant booster engines by burning unconsumed fuel included in turbopump exhaust. For instance, a turbopump that provides auxiliary power for a liquid rocket engine, such as to pump fuel and liquid oxygen into the liquid rocket engine combustion chamber, is powered by heated combustion gas of a gas generator or a tap-off manifold generated from a fuel rich mixture to provide a gas having a desired composition and relatively low temperature, such as around 1100K, for the turbopump. The fuel rich mixture that is combusted to power the turbopump includes unconsumed fuel that burns in ambient air accepted at a ramjet intake so that the mass flow exiting the ramjet booster increases based upon the ambient air passed through the booster without consuming additional liquid oxygen. In an example typical flightpath from launch to an altitude of 30 Km, a ramjet booster can provide additional thrust of 45800N at an altitude of 6214M. A high specific impulse of greater than 2100S at Mach 3 and 800S at Mach 10 is possible due to the additional mass airflow associated with ambient air that accelerates through the combustion chamber of the ramjet. In one example embodiment, a liquid rocket engine payload may increase by 20% using ramjet boosters to provide additional thrust. Ramjet booster engines tend to have a light weight and simple construction that may be separated from the rocket after use for reuse in subsequent launches of the rocket.

Another important advantage of the present invention is the adoption of the Borissov-Markusic Cycle to improve fuel efficiency across a variety of types of liquid rocket engines, booster engines and turbopumps. For instance, the liquid rocket engine may use conventional injectors, such as pintle injectors, or the crossfire injection introduced by Firefly. Turbopumps may be powered from tap-off gas or from separate gas generators. Booster engines may include a variety of different variants of ramjet engines that include ramjets having subsonic combustion, scramjets having supersonic combustion and dual mode ramjet scramjets that support both supersonic and subsonic combustion. As an example, a large spacecraft, such as the SpaceX Falcon 9, may include multiple liquid rocket engines that each have their own turbopump powered by its own gas generator. Capturing excess energy from fuel-rich gas generator exhaust and converting the excess energy to thrust with oxidation by ambient air increases payload both due to the additional thrust and also due to the increased mass flow of ambient air that is not carried as part of the propellant within storage tanks of the spacecraft.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

The invention introduces the Borissov-Markusic Cycle to solve the problem of low efficient open gas generator or tap-off gas generator turbopump power supply. A liquid rocket engine rocket generates additional thrust with one or more ramjet booster engines that burn unconsumed fuel of a turbopump exhaust with ambient air accepted through an intake of the one or more ramjet booster engines. The turbopump is powered by heated gas provided from a gas generator or a tap-off auxiliary power manifold that interfaces with a combustion chamber of the liquid rocket engine. Heated gases generated by the gas generator or in the liquid rocket engine combustion chamber have a fuel-rich composition that is desirable for turbopump operation. In an example embodiment that powers the turbopump with combustion chamber tap-off gas, tap-off gas thermal management and composition is provided by having fuel injected from fuel port openings formed at cooling channels integrated in a side wall proximate the tap-off manifold. In an example embodiment having cross-impinged injection of propellant in the combustion chamber that provides an oxygen-rich tap-off combustion gas mixture, fuel injection from the cooling channels into the tap-off manifold evaporates to cool the tap-off gases and then mixes with the oxygen-rich tap-off gases through axial flow encouraged by the tap-off manifold for volume distributed (flameless) burning with the resulting gas having a near-ideal composition for turbopump intake with minimal soot. The fuel rich combustion gas powers the turbopump, such as to pump fuel and liquid oxygen into the combustion chamber, and exhausts to a combustion chamber of a ramjet booster engine where unconsumed fuel burns with ambient air accepted through the intake of the ramjet booster engine. Ambient airflow not only provides oxidation of unconsumed fuel but increases the mass flow available to generate thrust without increasing the amount of propellant carried by the rocket. Energy extracted from unconsumed fuel of a turbopump exhaust improves rocket efficiency to generate additional thrust without increasing fuel carried by the rocket.

Figure 1:
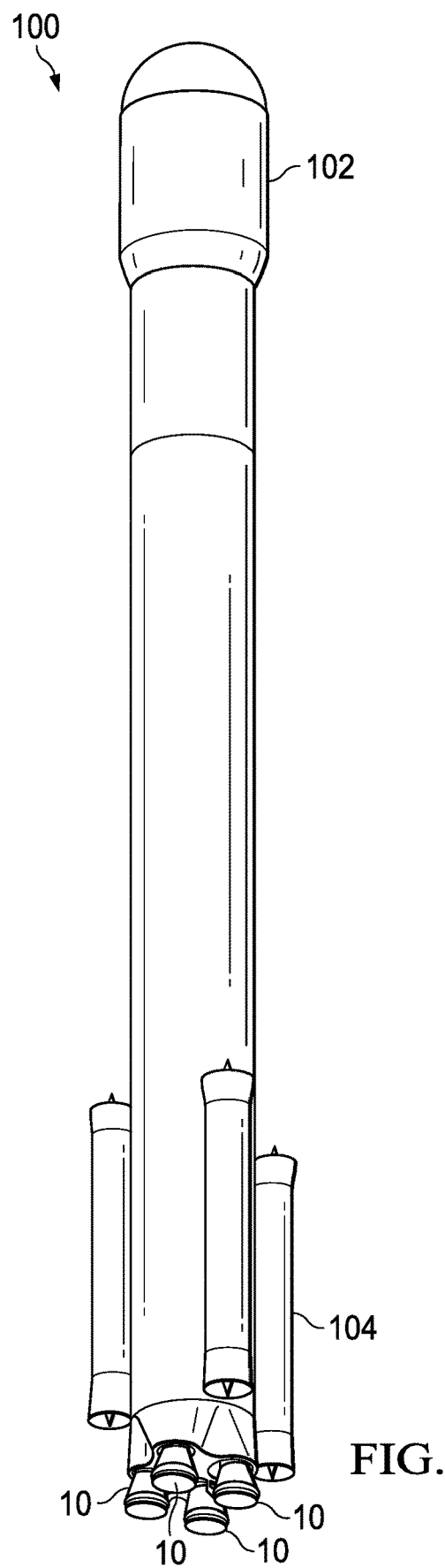
FIG. 1 depicts an isometric view of a rocket spacecraft configured to carry a payload into orbit around Earth.

Referring now to FIG. 1, an isometric view depicts a rocket spacecraft 100 configured to carry a payload 102 into orbit around Earth. Within the rocket spacecraft 100 is stored propellant that burns in liquid rocket engines 10, such as a tank of fuel (e.g., kerosene) and a tank of liquid oxygen. The propellant is pumped under high pressure into liquid rocket engines 10 where the fuel burns with the liquid oxygen to release energy that is converted to thrust as a supersonic airflow. The thrust generated by liquid rocket engine 10 depends upon a mass velocity of airflow having the mass provided from propellant carried on rocket spacecraft 100. To provide additional thrust with mass velocity of airflow augmented by ambient air, a set of ramjet booster engines 104 couple to rocket spacecraft 100. In the example embodiment, ramjet booster engines 104 are DMRS ramjet variant engines, however, in alternative embodiments other ramjet variant engines may be used, such as ramjet and scramjet engines. Ramjet booster engines 104 efficiently produce additional thrust by leveraging unconsumed fuel available from operations of liquid rocket engines 10 to accelerate ambient air for greater mass velocity flow. That is, ramjet booster engines 104 convert potential energy of fuel into kinetic energy by oxidation with ambient air where that fuel's kinetic energy would otherwise be wasted, such as partially burnt fuel particles exhausted from a turbopump. As is described in greater depth below, the unconsumed fuel is provided from exhaust of a turbopump that provides high pressure fuel and liquid oxygen to liquid rocket engines 10. In particular, the turbopump operates optimally with a heated air source that generates heated air as input to the turbopump with burning of fuel and liquid oxygen at a fuel rich composition. The heated air having the fuel rich composition is provided by a dedicated gas generator, essentially a small rocket engine, or by liquid rocket engine combustion gases that are tapped off from the liquid rocket engine combustion chamber as described in U.S. patent application Ser. No. 16/584,449 incorporated above. The heated air turns a turbine that in turn turns a pump that pumps fuel and liquid oxygen, and then the heated air exits the turbine and enters a ramjet booster engine so that the heated air's fuel rich composition is converted by the ramjet booster engine into thrust.

Figure 2:
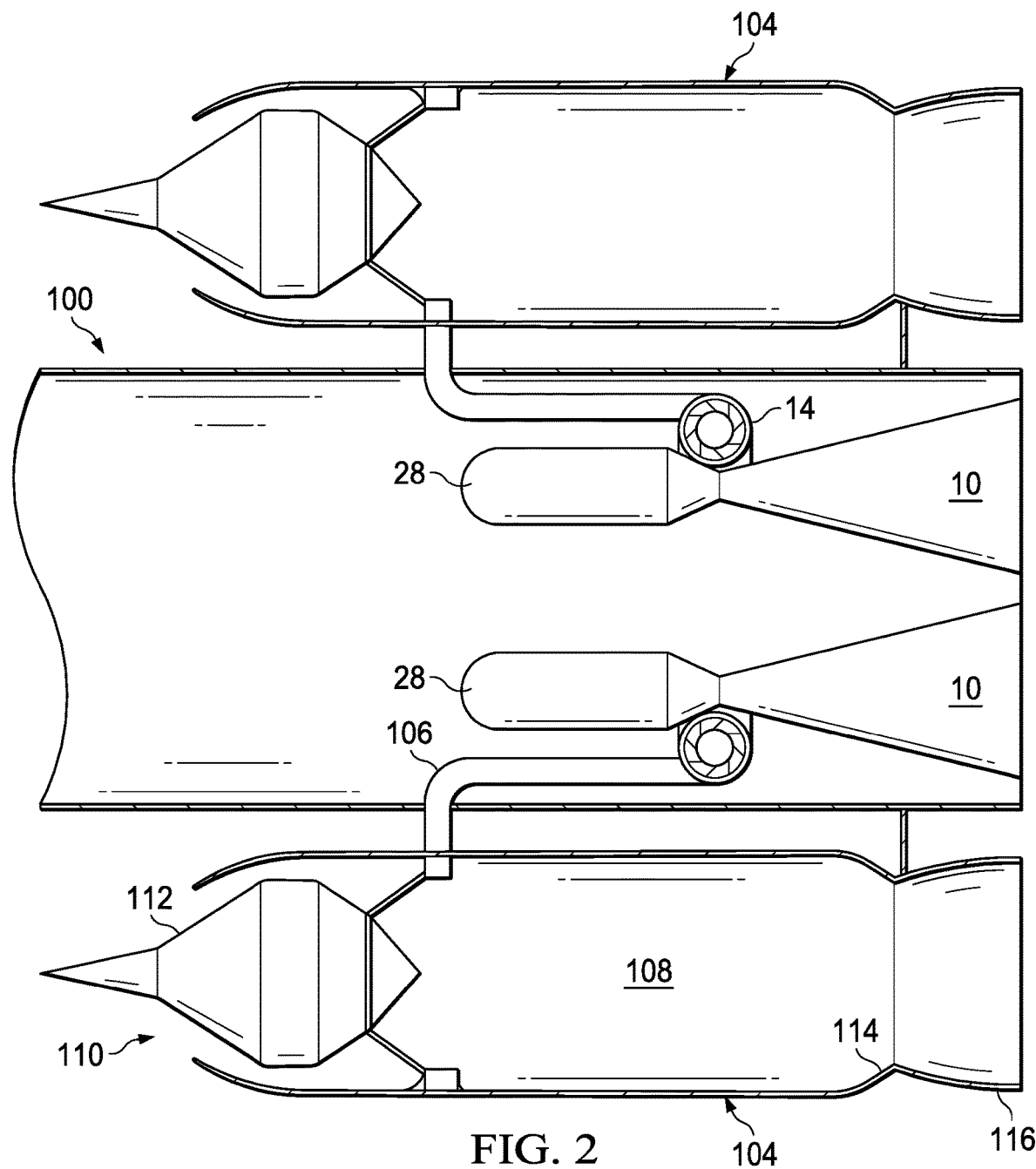
FIG. 2 depicts a side cutaway view of a pair of ramjet booster engines coupled to rocket spacecraft 100 and interfaced with a turbopump exhaust to convert unconsumed fuel of the turbopump exhaust into thrust.
Figures 8, 8A:
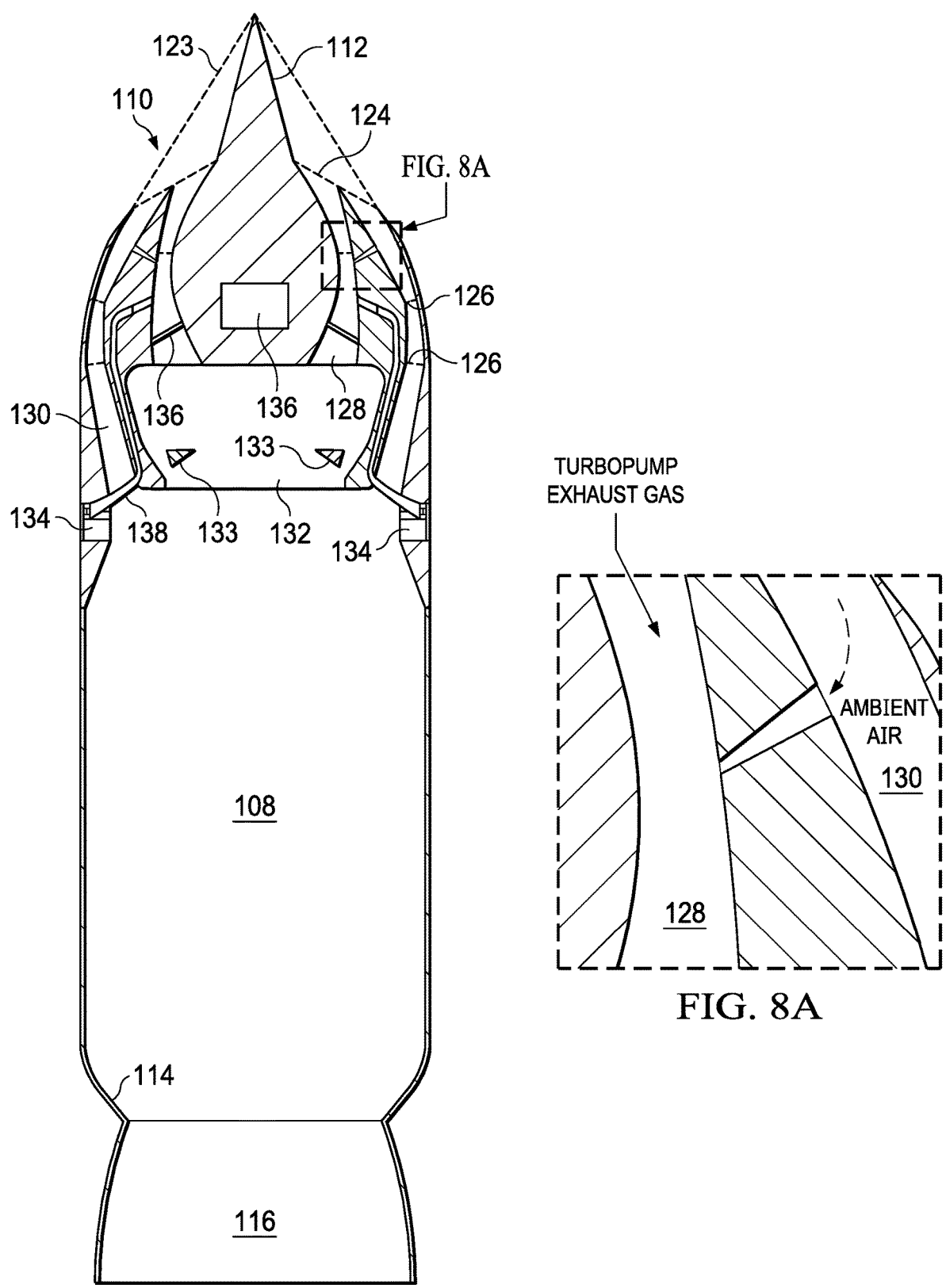
FIG. 8 depicts, a side cutaway view of an example embodiment of a dual mode ram/scram booster engine powered by unconsumed fuel of a liquid rocket engine turbopump.
FIG. 8A depicts an example embodiment of a passage to mix turbopump exhaust input as fuel to a ramjet booster with ambient air at lower ambient air velocity.

Referring now to FIG. 2, a side cutaway view depicts a pair of ramjet booster engines 104 coupled to rocket spacecraft 100 and interfaced with a turbopump exhaust to convert unconsumed fuel of the turbopump exhaust into thrust. In the example embodiment, combustion gases tapped-off from combustion chambers 28 of liquid rocket engines 10 provide kinetic energy in the form of heated air to power a turbine of turbopump 14. Once turbopump 14 extracts the kinetic energy, it exhausts the heated air through a turbopump exhaust feed 106 as a fuel feed into a combustion chamber 108 of ramjet booster engine 104. Ramjet booster engine 104 accepts ambient airflow through an intake 110 and applies the ambient airflow against a central intake body 112 that compresses the airflow for passage into combustion chamber 108, such as with a series of oblique and normal shockwaves. As unconsumed fuel of the turbopump exhaust oxidizes with ambient air from intake 110 in combustion chamber 108, potential energy is released that adds heat and pressure within combustion chamber 108 so that passage of the airflow through a throat 114 results in generation of a supersonic airflow out of nozzle 116. In the example embodiment, ramjet booster engines 104 are typically considered a "ram" variant that accepts a supersonic airflow, compresses the airflow to a subsonic airflow for combustion and then exhausts the heated airflow at supersonic speeds to generate thrust. FIG. 8 described in greater detail below depicts a dual mode ram/scram booster engine that performs both the subsonic combustion of a "ram" variant but also supersonic combustion of a "scram" variant. As used in the present invention, the term ramjet booster includes all variants of ramjet boosters unless further identified as a subsonic combustion that distinguishes the supersonic combustion of scram and dual mode ramjet boosters. The selection of a ramjet versus scramjet or dual mode booster will depend upon anticipated ambient airflow conditions during flight. Generally for initial launch and use in a first stage, a dual mode ram/scramjet booster will be used.

Figure 3:
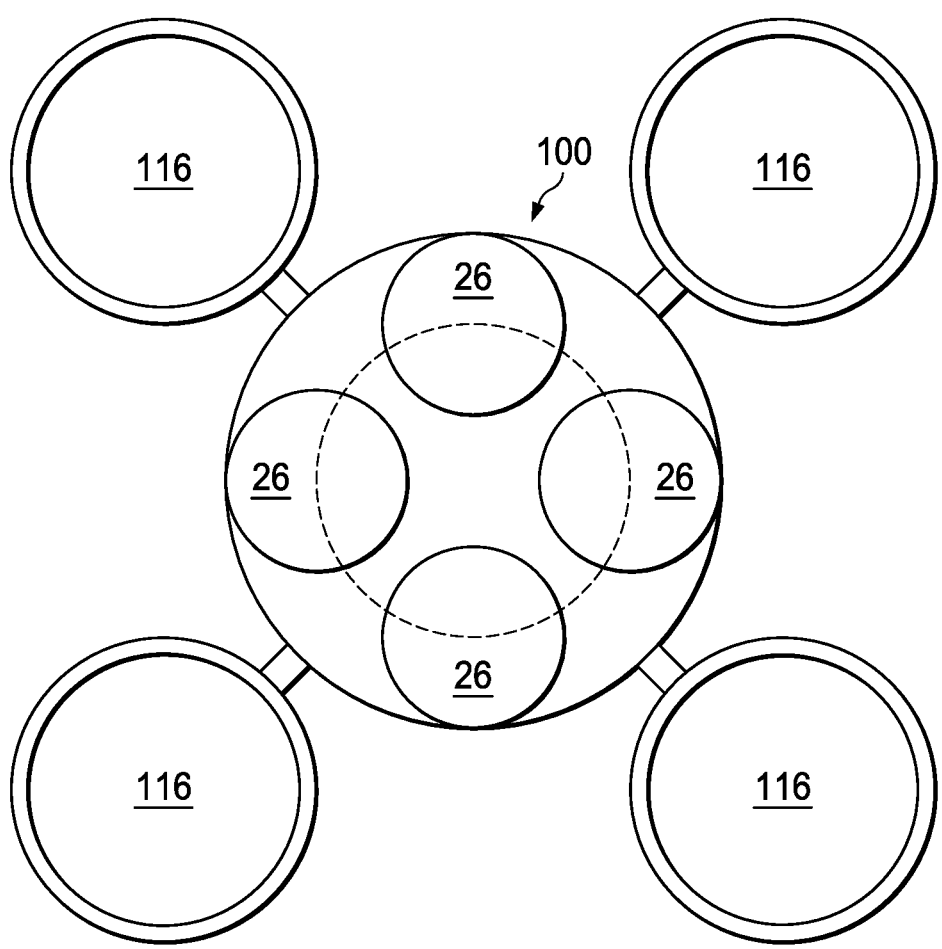
FIG. 3 depicts a bottom view of the rocket spacecraft configured with four liquid rocket engines that each output thrust from nozzles and four ramjet booster engines that each output thrust from nozzles.

In various embodiments, ramjet booster engines 104 may couple to rocket spacecraft 100 at various locations and in varied numbers to supplement thrust. FIG. 3 depicts a bottom view of rocket spacecraft 100 configured with four liquid rocket engines that each output thrust from nozzles 26 and four ramjet booster engines that each output thrust from nozzles 116. As an alternative, two ramjet booster engines may couple on opposite sides of rocket spaceship 100 to provide additional thrust to the four liquid rocket engines. In various embodiments, various combinations of numbers of ramjet booster engines may couple to a rocket spaceship 100 having various numbers of liquid rocket engines. The selection of the number of ramjet boosters may depend in part upon the exhaust provided by a single turbopump that pumps fuel and liquid oxygen for the liquid rocket engines, or, alternatively, multiple turbopumps that each provide exhaust to a burn at one or more ramjet boosters. For instance, unconsumed fuel of a turbopump exhaust may burn more efficiently by dispersing the turbopump exhaust across a predetermined number of ramjet boosters. Alternatively, each separate liquid rocket engine may have its own separate turbopump so that each turbopump provides its exhaust to only one of the plural ramjet boosters. In various embodiments, the number of ramjet boosters selected for a rocket spaceship may vary based upon the number of liquid rocket engines, the number of turbopumps and the fuel content that is in each turbopump's exhaust (i.e., the amount of unconsumed fuel as related to the degree of fuel rich content fed to the turbopump). As described further below, separate fuel and oxygen supplied to the ramjet booster (e.g. from fuel and liquid oxygen carried by the rocket spacecraft) in addition to turbopump exhaust may impact the number and distribution of ramjet boosters at the rocket spacecraft.

Figure 4:
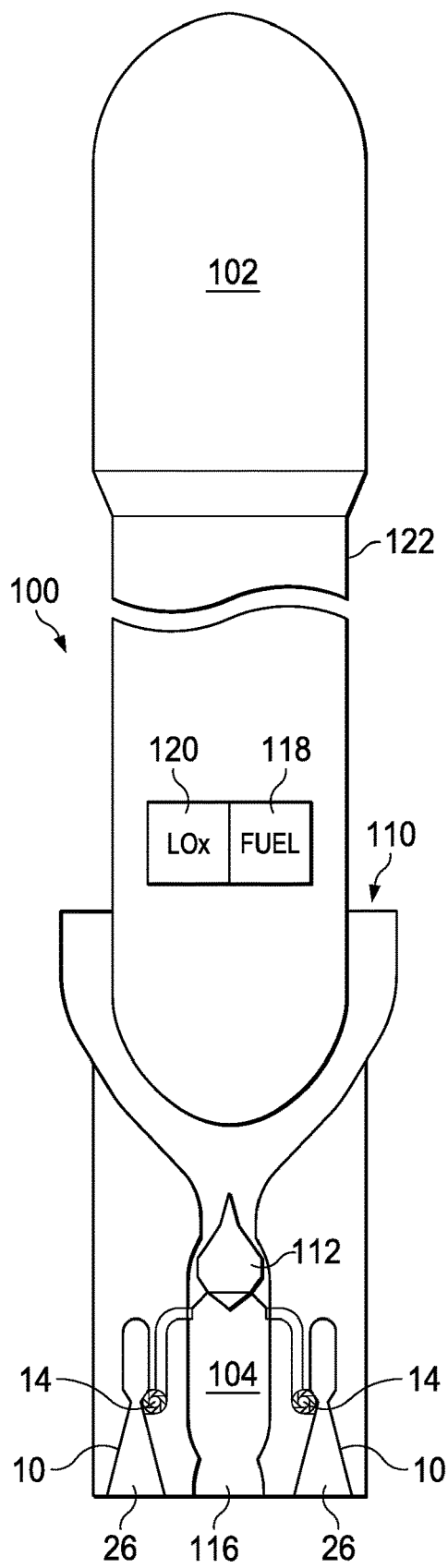
FIG. 4 depicts a side cutaway view of an example embodiment of a rocket spacecraft having a single centrally located ramjet booster engine and plural liquid rocket engines disposed around a perimeter of the liquid rocket engine.
Figure 5:
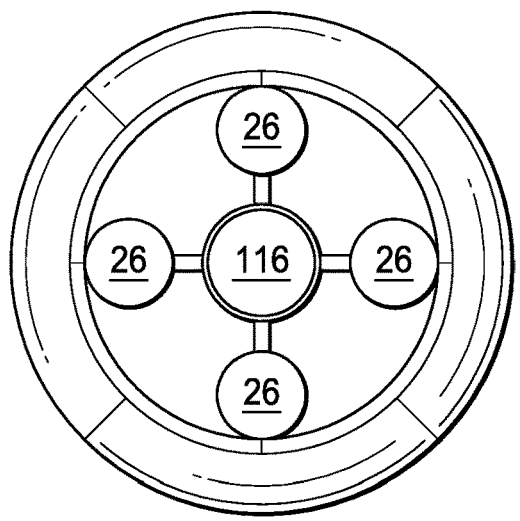
FIG. 5 depicts a bottom view of the rocket spacecraft of FIG. 4.

Referring now to FIG. 4, a side cutaway view depicts an example embodiment of a rocket spacecraft 100 having a single centrally located ramjet booster engine 104 and plural liquid rocket engines 10 disposed around a perimeter of the ramjet booster 104. FIG. 5 depicts a bottom view of the rocket spaceship 100 having the centrally-located ramjet booster nozzle 116 with four surrounding liquid rocket engine nozzles 26. In the example embodiment, each liquid rocket engine 10 has a turbopump 14 that feeds exhaust to the one ramjet booster engine 104. In alternative embodiments, a single turbopump might be used or less than all of the turbopumps may direct exhaust into ramjet booster engine 104. Intake 110 integrates into the body of rocket spaceship 100 to direct ambient airflow towards a central pathway into ramjet booster rocket 104. Payload 102, fuel storage 118 and liquid oxygen storage 120 are in a main body 122 that separates from the engines after fuel burn by the rockets is complete.

Figure 6:
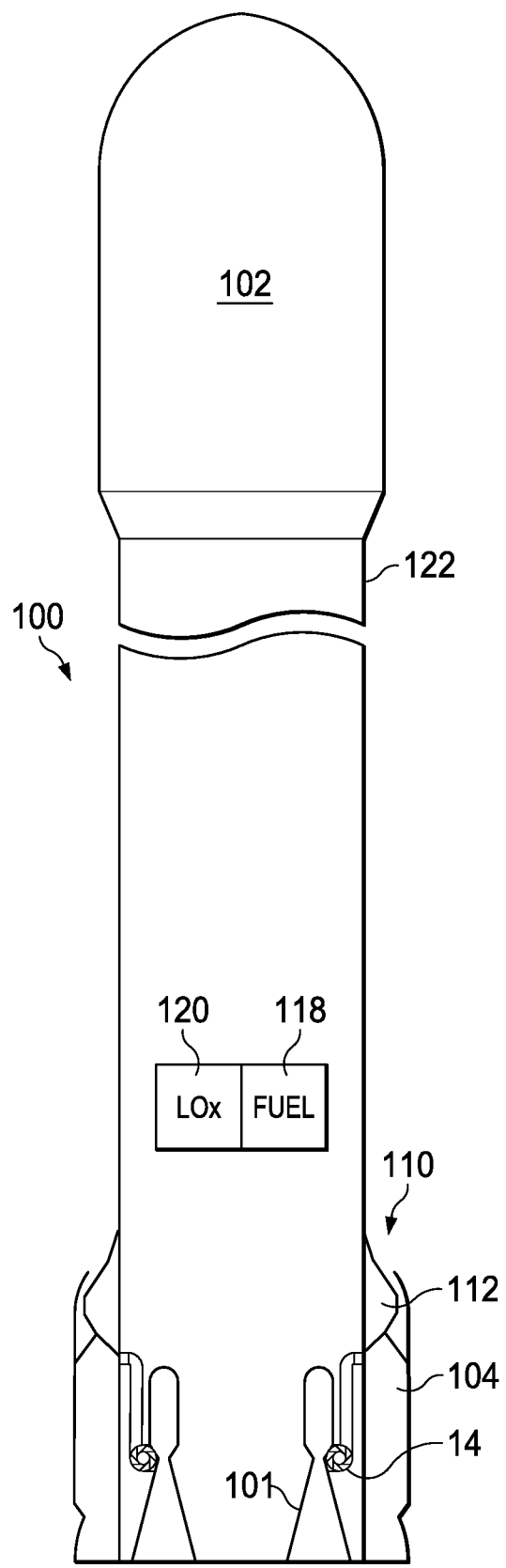
FIG. 6 depicts a side cutaway view of an example embodiment of a rocket spacecraft having four centrally located liquid rocket engines with a ramjet booster engine integrated in the rocket main body outer surface.
Figure 7:
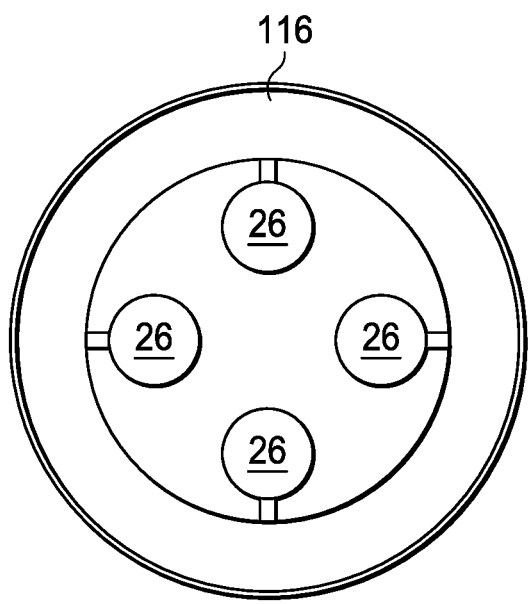
FIG. 7 depicts a bottom view of the rocket spacecraft of FIG. 6.

Referring now to FIG. 6, a side cutaway view depicts an example embodiment of a rocket spacecraft 100 having four centrally located liquid rocket engines with a ramjet booster engine 104 integrated in the rocket main body 122 outer surface. In the example embodiment, intake 110 has a circular shape around the perimeter of main body 122 to direct ambient airflow through a semi-circular shaped combustion chamber and out a nozzle 116, shown in FIG. 7, formed as a circle around main body 122. In the example embodiment, both turbopumps 14 exhaust into the ramjet booster 104 to provide unconsumed fuel for generating thrust. In various embodiments, circular ramjet booster 104 may have a single combustion chamber or have multiple divisions, such as to manage thrust distribution.

Referring now to FIG. 8, a side cutaway view depicts an example embodiment of a dual mode ram/scram booster engine powered by unconsumed fuel of a liquid rocket engine turbopump. A central intake body 112 defines ram ducts 128 and scram ducts 130 of intake 110 that accept ambient air into ram combustion chamber 132 and scram combustion chamber 108. Ram airflow is slowed and compressed by oblique shockwaves 123 and 124 formed by intake body 112 and normal shockwaves 126 within ram duct 128 and scram duct 130. A ram combustor/flameholder 133 ignites fuel in a subsonic flow region that accelerates to a higher speed as it leaves ram combustion chamber 132 to enter scram combustion chamber 108. Unconsumed fuel in the exhaust gas from a turbopump as described above, enters through a fuel manifold 134 which then distributes the exhaust gas as fuel into the ram and scram combustion chambers through controllable valves. One part of the gas passes through strut 138 into ram duct 128 at fuel injector 136. Scram ducts 130 accept a supersonic flow that maintains supersonic speed as it passes through. Another part of unconsumed fuel in the exhaust gas from a turbopump enters directly into scram combustion chamber 108 through a fuel manifold 134. The dual mode operation provides thrust from low speeds through approximately Mach 4 with ram operation in the central portion of intake 110 and, above Mach 4, with scram operation that maintains supersonic flow.

One consideration at lower speeds is that turbopump exhaust will enter ramjet boost 104 under pressure that could result in some of the heated gas to exit out of intake 110 until the rocket spacecraft accelerates to a minimal speed. This effect may be reduced by delaying ignition of fuel within combustion chamber 108 until a sufficient airspeed is generated to support RAM compression and combustion. This effect may also be reduced or eliminated by compressing air at intake 110 with the pressure provided by a solid rocket fuel or by the turbopump gas, such as in a manner similar to compression that is created by solid rocket type ramjets. In addition, if a movable nozzle 116 and a movable intake 110 are included in the ramjet booster, the nozzle may be opened to aid flow out while the intake is closed to prevent flow out.

Figure 9:
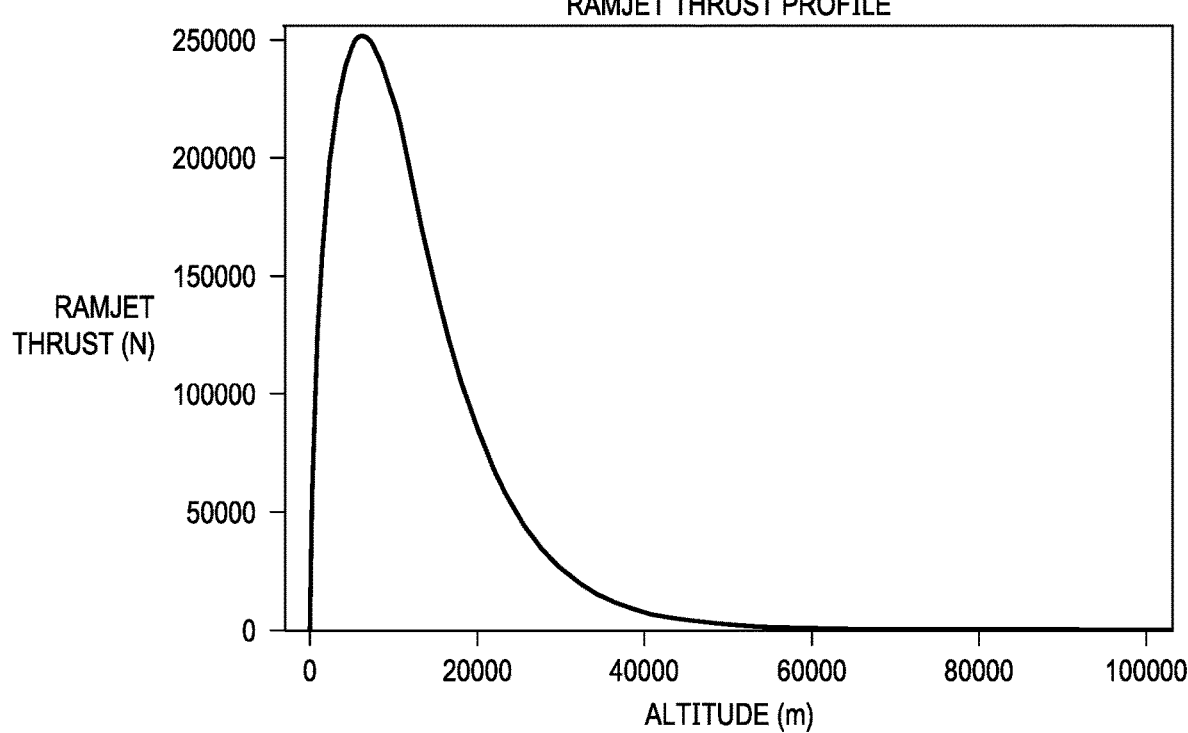
FIG. 9 provides an example embodiment thrust profile that illustrates how thrust generated by the ramjet changes with speed and altitude.
Figure 10:
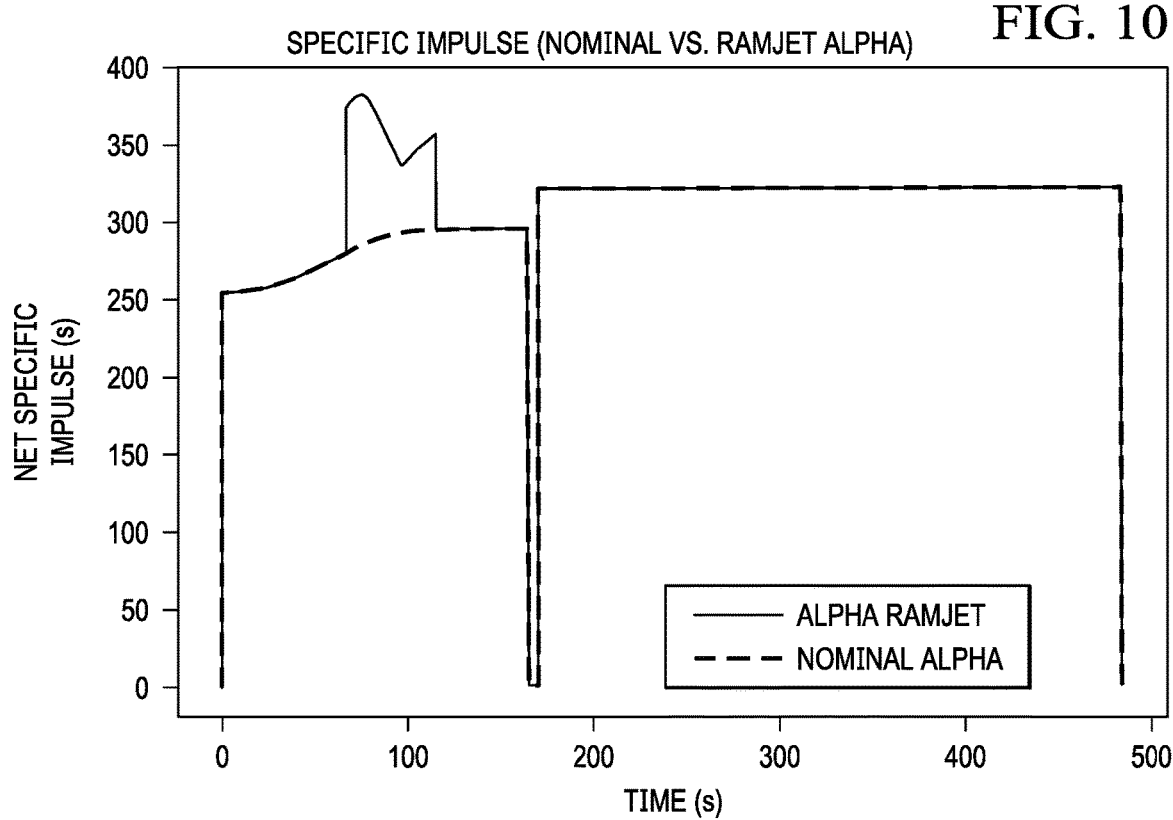
FIG. 10 depicts an example embodiment of specific impulse provided by a ramjet booster over a rocket spacecraft launch.

As ambient airspeed builds, the pressure provided by airflow at intake 110 will provide compression that increases thrust and allows transition of the intake and nozzle to normal operating positions. In various embodiments, other techniques may be used to manage backpressure working against the turbopump exhaust so that turbopump efficiency is not impacted. Other ramjet variants may be used in the places of the example embodiment based upon the anticipated launch conditions, such as the altitude and speed at which a stage initiates and completes thrust generation. As an example, a solid rocket fuel may be used to block airflow out of combustion chamber 108 and towards intake 110. The solid rocket fuel may generate thrust or may generated oxygen for combustion with fuel-rich turbopump exhaust that generates thrust. As the solid rocket fuel burns away, an opening from intake 110 is provided for ambient air to enter due to compression generated by increased airspeed. The amount of solid rocket fuel is selected so that ambient air begins to enter combustion chamber 108 from intake 110 as the ambient airspeed becomes sufficient to support RAM compression and combustion. FIG. 9 provides an example embodiment thrust profile that illustrates how thrust generated by the ramjet changes with speed and altitude. FIG. 10 provides an example embodiment specific impulse provided by a ramjet booster over a rocket spacecraft launch, such as the Alpha spacecraft of Firefly.

Referring now to FIG. 8A, an example embodiment depicts a passage to mix turbopump exhaust input as fuel to a ramjet booster with ambient air at lower ambient air velocity. Turbopump exhaust provided through fuel manifold 134 proceeds into fuel injector 136 through a narrow throat that interfaces with ambient air provided from intake 110, such as with an opening to SCRAM duct 130. Increased airspeed through the narrow portion reduces pressure through the throat to draw in ambient air for mixing with the turbopump exhaust. The ambient air includes oxygen for oxidation of unconsumed fuel within the turbopump exhaust as the mixture proceeds into the RAM combustor/flameholder 132 for oxidation. At lower speeds where intake 110 provides minimal compression, such as subsonic speeds, the ambient air may provide opportunistic thrust increase by supporting oxidation of fuel until sufficient ambient airspeed is generated to compress the airflow received at intake 110 and through RAM duct 128. The amount of ambient airflow may be managed with valves or other mechanisms so that backpressure from combustion within combustion chamber 108 does not become excessive, such as by restricting the amount of fuel that oxidizes by managing the amount of ambient airflow. As airspeed increases towards supersonic values where a RAM combustion is supported, a valve may close off the air passage.

Figure 11:
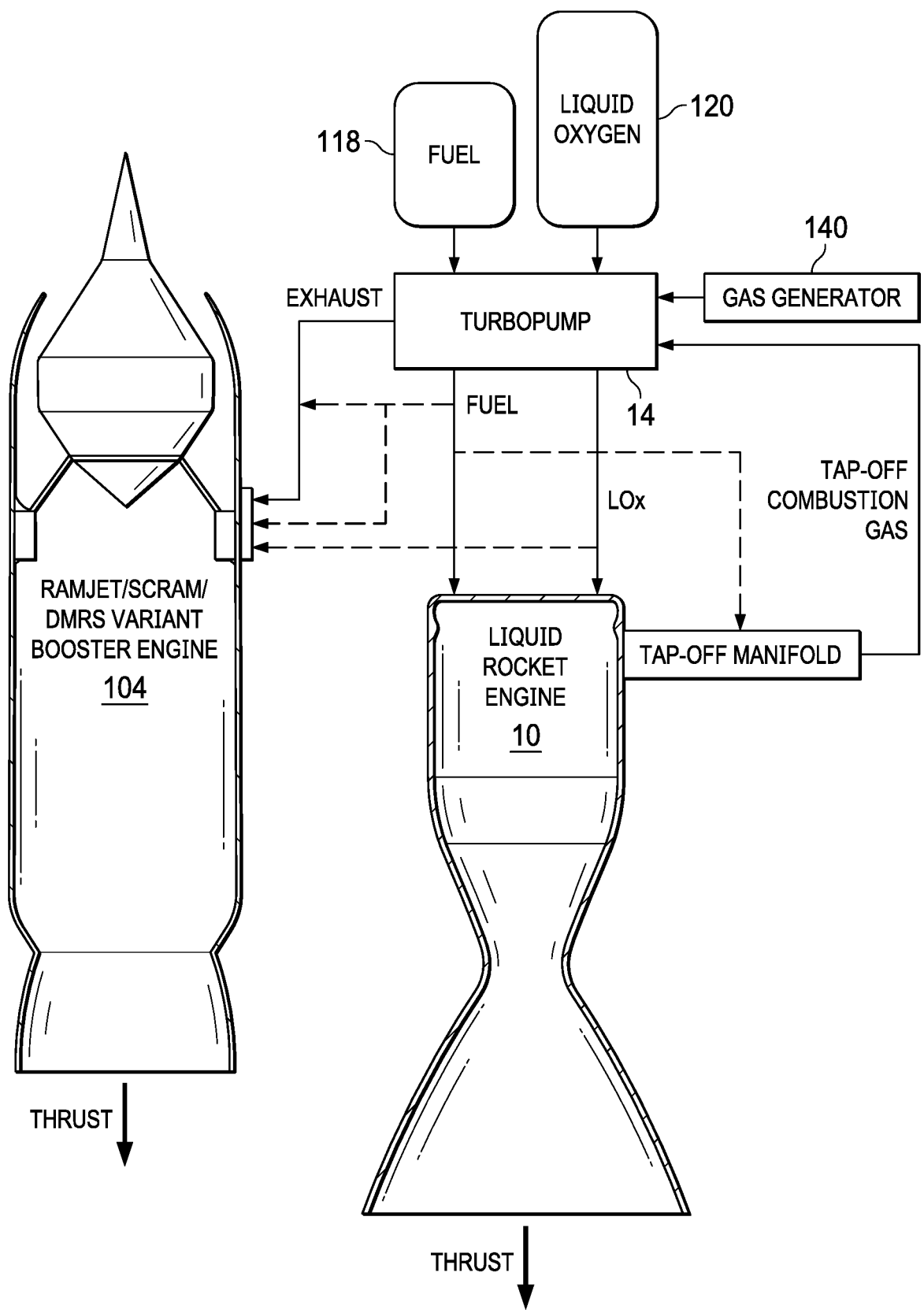
FIG. 11 depicts a block diagram of various ways in which a ramjet booster engine may be implemented to aid efficient launch of a liquid rocket engine spacecraft by leveraging the new Borissov-Markusic cycle and illustrating an example of the new Borissov-Markusic rocket engine cycle where the energy from exhaust is recovered as thrust through a ram/scram jet engine.

Referring now to FIG. 11, a block diagram depicts various ways in which a ramjet booster engine may be implemented to aid efficient launch of a liquid rocket engine spacecraft by leveraging the new Borissov-Markusic cycle. Liquid rocket engine payload is increased for a given fuel quantity by more efficiently converting fuel into kinetic energy. First, a fuel rich exhaust mixture applied at a turbopump is directed towards a booster engine that further extracts energy from the fuel to generate thrust. The booster engine extracts fuel energy by oxidizing unconsumed fuel found in the turbopump exhaust with ambient air so that the total energy of booster engine exhaust has an increased mass flow velocity provided by ambient air mass rather than liquid oxygen carried by a spacecraft. In various operating conditions, the amount of energy extracted by the booster engine from the turbopump exhaust may be further enhanced with adjustments to the fuel oxygen mixture provided to the booster engine. For instance, fuel/oxygen mixture may be increased at the turbopump intake so that the turbopump exhaust has a greater fuel content; fuel content may be increased by adding fuel to the turbopump exhaust before the turbopump exhaust enters the booster engine; and/or fuel may be added directly to the booster engine in a conventional manner in addition to the turbopump exhaust. Similarly, oxygen may be supplemented to the booster engine from the liquid oxygen supply tank of the spacecraft so that the fuel more efficiently burns when oxygen content is otherwise low, such as when the booster engine has insufficient airflow speed for intake compression and at higher altitudes when oxygen content is low. In particular, maximizing fuel oxidation in the booster engine when ambient airflow provides optimal mass flow velocity help to increase overall efficient use of fuel by the spacecraft.

In the example embodiment of FIG. 11, turbopump 14 interfaces with fuel storage 118 and liquid oxygen storage 120 to pump these propellants at high pressure into liquid rocket engine 10. In the example embodiment, turbopump 14 is powered by heated gas provided from tap-off of combustion chamber gas of liquid rocket engine 10 and/or a separate gas generator 140. Gas generator 140 is, for example, a small rocket motor that exhausts into turbopump 14. Generally, heated gas that powers turbopump 14 has a fuel-rich content to provide optimal flow characteristics and composition to interact with a turbine within turbopump 14. The heated gas translates thermal energy and pressure into turbine movement that turns pumps for fuel and liquid oxygen. At exhaust from turbopump 14, the heated gas has released some energy while maintaining a fuel rich composition so that injection into ramjet booster 104 is made under pressure and with high thermal content that prepares the unconsumed fuel in the exhaust for oxidation with ambient air to generate thrust. In one embodiment, the turbopump exhaust has sufficient unconsumed fuel content to provide a desired fuel mixture with ambient air in ramjet booster 104 for efficient thrust generation so that no additional fuel is added to the turbopump exhaust through the ramjet operation. In the event that additional fuel content is desired, fuel may be added to the exhaust after leaving turbopump 14 and before injection of the exhaust in ramjet booster 104. Alternatively, fuel may be directly injected into ramjet booster 104 in a conventional manner in addition to the fuel content of exhaust from turbopump 14. In some instances, such as at low speeds or high altitudes, liquid oxygen may also be injected into ramjet booster engine 104. Ideally, ramjet 104 produces thrust with mass airflow of ambient air to effectively reduce the weight of oxidant carried by the rocket spacecraft; however, in some circumstances, adding oxygen may allow additional thrust to be generated from unconsumed fuel of turbopump 14 exhaust where oxygen content is low, such as at low speeds on initial launch or at high altitudes. Essentially in such conditions, ramjet booster engine 104 becomes, at least in part, a liquid rocket engine that helps to improve efficient energy extraction from unconsumed fuel. As an example of the energy content provided by turbopump exhaust unconsumed fuel, an example embodiment has a temperature of 900 degrees Kelvin at 25PSI with a mixture of combustible elements that include methane, carbon monoxide and hydrogen, such as with a combustible mass fraction of 0.74.

Figure 12:
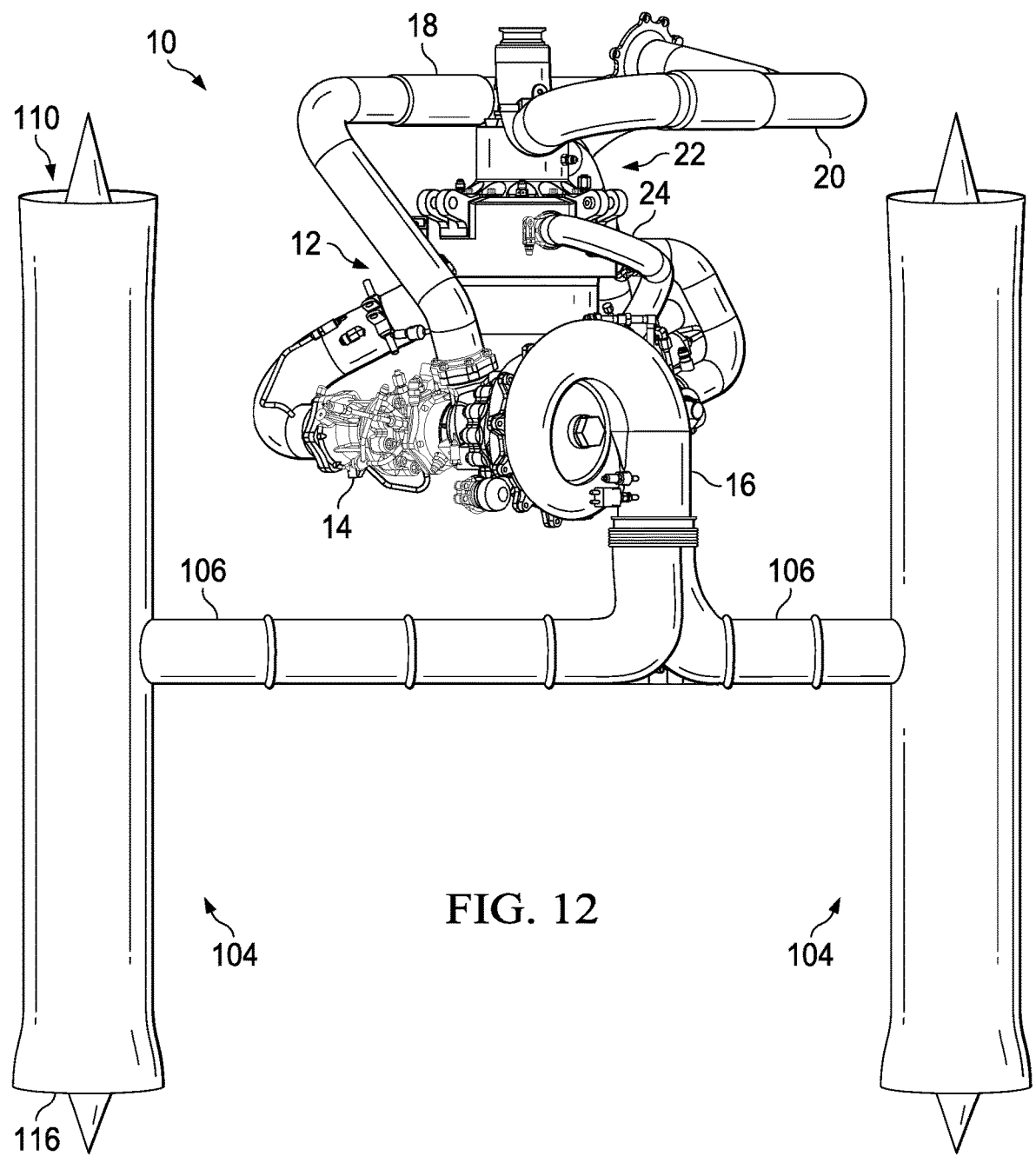
FIG. 12 depicts a side view of a liquid rocket engine configured to power a turbopump with heated gases provided from the liquid rocket engine's combustion chamber through a tap-off supply and then putting the after-turbine exhaust gas with a high amount of unconsumed fuel, which was used to manage the temperature of heated gas from tap-off not to burn the turbine blades, into the ram/scram engine.

Referring now to FIG. 12, a side view depicts a liquid rocket engine 10 configured to power a turbopump 14 with heated gases provided from the liquid rocket engine's combustion chamber through a tap-off supply 12. Liquid rocket engine 10 generates thrust by forcing oxygen and fuel with turbopump 14 from a liquid oxygen supply 18 and a fuel supply 20 into a combustion chamber for burning. For instance, liquid rocket engine 10 is built into a rocket that houses a liquid oxygen tank interfaced with liquid oxygen supply 18 and a fuel tank interfaced with fuel supply 20. Turbopump 14 pumps oxygen provided from liquid oxygen supply 18 to a liquid oxygen feed 22 that interfaces with an oxygen manifold, and pumps fuel provided from fuel supply 20 to a fuel feed 24 that interfaces with a fuel manifold. Fuel and oxygen pumped into liquid rocket engine 10 burn to generate combustion gases having high temperatures and pressures that are forced through a throat and out a nozzle 26, which converts the internal energy of the combustion gases to a kinetic energy of supersonic flow. Turbopump 14 exhausts tap-off gases at a tap-off exhaust 16 that feeds through a pipe interface into first and second ramjet booster engines 8. The energy of unconsumed fuel in the turbopump exhaust gas translates into thrust generated by ramjet booster engines 104 when the unconsumed fuel oxidizes with oxygen in the ambient air. In addition, ambient air that does not react with unconsumed fuel also accelerates through each ramjet booster 104 as a result of energy release by oxidation of the unconsumed fuel, which heats and pressurizes the ambient air to increase the mass flow rate through each ramjet booster engine 104.

Figure 13:
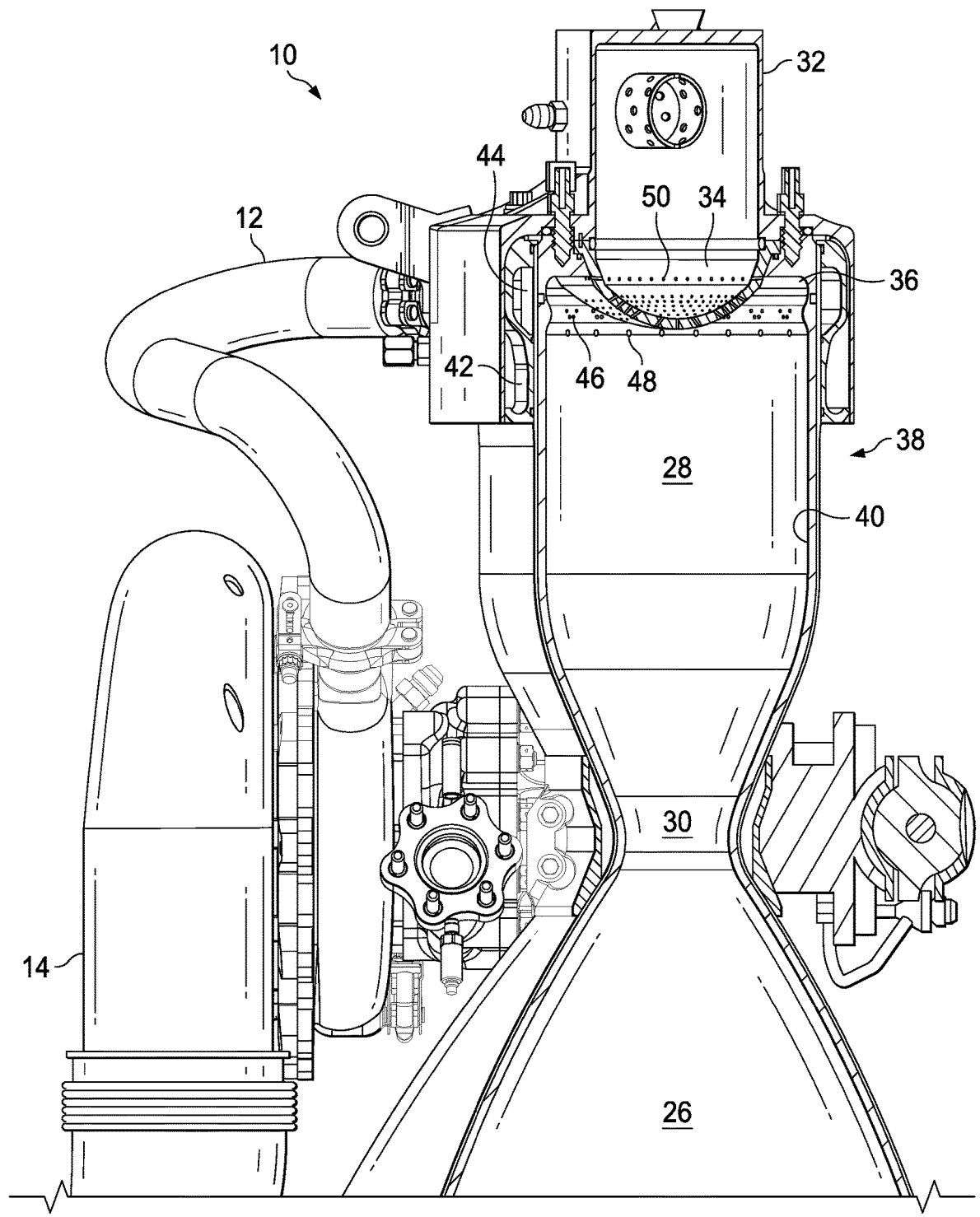
FIG. 13 depicts a side cutaway view of the liquid rocket engine configured to tap-off combustion chamber gases formed with a toroidal vortex flow of cross impinged fuel port openings in a side combustion chamber wall and an oxygen injector centrally located at the combustion chamber headend.

Referring now to FIG. 13, a side cutaway view depicts liquid rocket engine 10 configured to tap-off combustion chamber 28 gases formed with a toroidal vortex flow of cross impinged fuel port openings 46 in a side combustion chamber wall 40 and an oxygen injector 34 centrally located at the combustion chamber 28 headend 36. In the example embodiment, thruster body 38 forms a combustion chamber 28 terminated at a headend 36 to force high temperature and pressure exhaust gases through a throat 30 and out a nozzle 26, thus generating a supersonic exhaust flow. An oxygen manifold 32 located above headend 36 of thruster body 38 receives liquid oxygen from turbopump 14 at high pressure to force the liquid oxygen into oxygen injector 34 for injection through oxygen port openings 50 into combustion chamber 28. Similarly, a fuel manifold 42 located exterior to combustion chamber wall 40 below headend 36 of thruster body 38 receives fuel, such as kerosene, from turbopump 14 at high pressure to force the fuel through fuel port openings 46 formed through combustion chamber wall 40. As is set forth below and in the incorporated patent applications in greater detail, fuel provided to fuel manifold 42 is forced through fuel channels integrated within combustion chamber wall 40 to provide regenerative cooling to thruster body 38 before injection into combustion chamber 28. Tap-off openings 48 formed in combustion chamber wall 40 provide a pathway for heated combustion gases from combustion chamber 28 into tap-off manifold 44 from which the combustion gases exit to tap-off supply 12 as a power source for turbopump 14. In the example embodiment, fuel port openings 46 are symmetrically disposed about the inner surface circumference of combustion chamber wall 40 above symmetrically disposed tap-off openings 48 relative to headend 36. As is set forth below, the toroidal vortex generated by impingement of fuel and oxygen injection within combustion chamber 28 results in an oxygen rich gas content at tap-off openings 48.

In various embodiments, the relative placement of tap-off opening 48 may be adjusted so that oxygen content is of a desired amount in the composition of gas that enters tap-off opening 48. In the example embodiment, cross-impingement injection of fuel and oxygen was used as described in greater detail by the incorporated patent applications. However, in alternative embodiments, the main combustion chamber may have a different fuel and oxygen injectors found in conventional liquid rocket engines, like pintle injectors or coaxial swirl or injectors. In such conventional liquid rocket engines, the turbopump may be powered by a gas generator or with tap-off gas taken from the conventional liquid rocket engine in the same or a similar manner as for the cross-impingement arrangement Although the ramet booster engines described provide improve efficiency when used with the liquid rocket engine and tap-off manifold of the incorporated patents, alternative embodiments will enhance thrust and efficiency with other types of liquid rocket engines and gas generators that support turbopump operation.

Although the present invention has been described in detail, it should be understood that various changes, substitutions and alterations can be made hereto without departing from the spirit and scope of the invention as defined by the appended claims.

What is claimed is:
1. A rocket comprising:
a rocket body having plural liquid rocket engines in an interior of the rocket body, the plural liquid rocket engines generating thrust;
plural turbopumps external to the liquid rocket engine and each having an intake and an exhaust, the intake accepting heated air, each turbopump converting energy of the heated air to pump propellant to one associated liquid rocket engine, the exhaust exhausting the heated air; and
plural ramjet engines external to the rocket body and having an ambient air intake, a combustion chamber and a nozzle, an associated one of the plural turbopumps directing the turbopump exhaust interfaced with an associated one of the plural ramjet engine combustion chambers, the exhausted heated air including unconsumed fuel that burns in the combustion chamber with oxygen of the ambient air.
2. The rocket of claim 1 further comprising:
a tap-off manifold interfaced with the liquid rocket engine at a combustion chamber of the liquid rocket engine to accept combustion gases from the liquid rocket engine;
wherein the tap-off manifold provides the combustion gases to the turbopump intake as the heated air.
3. The rocket of claim 2 further comprising fuel ports interfaced with the tap-off manifold and operable to inject fuel into the combustion gases.
4. The rocket of claim 1 further comprising a gas generator interfaced with a fuel source and liquid oxygen source to burn fuel and liquid oxygen to generate the heated air.
5. A method for generating thrust with unconsumed fuel exhausted from a liquid rocket engine auxiliary power system, the method comprising:
passing exhaust gas generated by burning fuel to plural turbopumps, the exhaust gas including unconsumed fuel;
applying the exhaust gas at each turbopump to pump fuel to an associated one of plural liquid rocket engines located in an interior of a rocket body;
burning the fuel in a thruster body combustion chamber of each of the plural liquid rocket engines integrated in the rocket body interior with liquid oxygen;
directing the exhaust gas from each turbopump to each of plural booster engines located external to the liquid rocket engine and coupled to the rocket body exterior;

mixing the exhaust gas with ambient air in each booster engine; and igniting the unconsumed fuel of the exhaust gas in the booster engine to generate thrust.

6. The method of claim 5 further comprising:
generating the exhaust gas with a gas generator; and
coupling the gas generator to an intake of the turbopump.

7. The method of claim 5 further comprising:
generating the exhaust gas with a combustion chamber of the liquid rocket engine;
tapping-off the exhaust gas from the combustion chamber to a tap-off manifold; and
coupling the tap-off manifold to an intake of the turbopump.

8. The method of claim 7 further comprising:
injecting fuel into the exhaust gas at the tap-off manifold.

9. The method of claim 5 wherein the mixing the exhaust gas with ambient air further comprises:
injecting the exhaust gas at a combustion chamber of the booster engine; and
directing the ambient air into the combustion chamber through an intake based upon movement of the booster engine through the ambient air.

10. The method of claim 9 wherein the booster engine comprises a Ramjet engine.

11. The method of claim 10 further comprising adjusting a configuration of the Ramjet engine based upon ambient air speed to operate as a Scramjet.

12. The method of claim 9 further comprising:
monitoring one or more predetermined conditions associated with ambient air movement relative to the intake; and
initiating burning of the unconsumed fuel only upon detection of the one or more predetermined conditions.

13. A spacecraft comprising:
a rocket body having an interior and a payload;
plural liquid rocket engines coupled within the rocket body interior, each liquid rocket engine having a combustion chamber aligned along a thrust axis, the combustion chamber terminated at a first end by a headend and opened at a second opposing end by a throat;
an oxygen source interfaced with each of the plural liquid rocket engines to provide oxygen to the combustion chamber;
a fuel source interfaced with each of the plural liquid rocket engines to provide fuel to the combustion chamber;
plural turbopumps, each of the plural turbopumps having a turbine that turns a pump, the pump interfaced with the fuel source to pressurize the fuel for injection into the combustion chamber, the turbine having a turbine exhaust that exhausts gas including at least some unconsumed fuel; and plural booster engines coupled external to the rocket body, each of the plural booster engines having an ambient air intake to accept ambient air, a booster combustion chamber interfaced with the ambient air intake and a booster exhaust nozzle interfaced with the booster combustion chamber to exhaust airflow from the booster combustion chamber and out the booster exhaust nozzle;
wherein each of the plural turbopumps is associated with one of the plural liquid rocket engines and each of the turbine exhausts interfaces with one of the plural booster engines and each of the booster combustion chambers oxidizes the unconsumed fuel with oxygen of the ambient air to generate thrust out of the booster engine exhaust nozzle.

14. The spacecraft of claim 13 further comprising:
a tap-off manifold interfaced with each of the plural liquid rocket engines combustion chamber and with the turbopump turbine associated with each of the plural liquid rocket engines, the tap-off manifold configured to receive combustion gases from the combustion chamber and to direct the combustion gases into the turbopump turbine, the combustion gases powering the turbine to turn the pump, the combustion gases including unconsumed fuel.

15. The spacecraft of claim 14 further comprising:
fuel ports interfacing the fuel source with the tap-off manifold;
wherein the fuel ports direct the fuel into the tap-off manifold to mix with the combustion gases.

16. The spacecraft of claim 14 further comprising:
fuel ports interfacing the fuel source with the turbopump turbine exhaust;
wherein the fuel ports direct the fuel into the turbopump exhaust to mix with the combustion gases.

17. The spacecraft of claim 13 further comprising a gas generator interfaced with the turbine and combusting the fuel and the oxygen to generate heated gas to power the turbine, the heated gas including unconsumed fuel.

18. The spacecraft of claim 13 wherein each of the plural booster engine comprises a dual mode Ram/Scram engine having a variable ambient air intake, the variable ambient air intake configuring to reduce ambient airflow into the intake when the airflow has less than a predetermined speed.

19. The spacecraft of claim 13 wherein each of the plural booster engine comprises a flame holder operable to provide a flame to ignite the unconsumed fuel in the booster combustion chamber, the flame holder providing flame at only greater than a predetermined speed of the ambient airflow.

20. The spacecraft of claim 13 wherein the booster engine comprises a Ramjet engine.

* * * * *